(12) United States Patent
Miyagawa

(10) Patent No.: US 6,508,712 B1
(45) Date of Patent: Jan. 21, 2003

(54) RECORDING MEDIUM HAVING SEQUENTIALLY ACCESSIBLE DATA RECORDING REGIONS, DATA ACCESS METHOD, GAME PROGRESS CONTROL METHOD, AND GAME MACHINE

(75) Inventor: Yoshiyuki Miyagawa, Tokyo (JP)

(73) Assignee: Square Co., Ltd., Tokyo (JP)

( * ) Notice: Subject to any disclaimer, the term of this patent is extended or adjusted under 35 U.S.C. 154(b) by 4 days.

(21) Appl. No.: 09/580,422

(22) Filed: May 30, 2000

(30) Foreign Application Priority Data

Nov. 17, 1999 (JP) .......................................... 11-327555

(51) Int. Cl.$^7$ .................................................. A63F 9/24
(52) U.S. Cl. ............................................. 463/43; 463/1
(58) Field of Search ................................ 463/1, 30–33, 463/43, 44

(56) References Cited

U.S. PATENT DOCUMENTS 5,437,464 A * 8/1995 Terasima et al. ............ 273/434
5,609,525 A * 3/1997 Ohno et al. .................... 463/43
5,926,612 A * 7/1999 Gillard et al. ............... 386/122
6,023,552 A * 2/2000 Kunihiro ....................... 386/98
6,165,073 A * 12/2000 Miyamoto et al. ............ 463/32
6,226,446 B1 * 5/2001 Murase et al. ................. 386/95

FOREIGN PATENT DOCUMENTS

JP 07-193774 * 7/1995 ............ H04N/5/85

* cited by examiner

Primary Examiner—Joe H. Cheng
Assistant Examiner—K. Nguyen
(74) Attorney, Agent, or Firm—Greenblum & Bernstein, P.L.C.

(57) ABSTRACT

A composite data set which includes a plurality of data to be read out when a new scene of a video game has started, the respective data names, and an index to be used for reading out the data in a separated manner, is recorded on a plurality of consecutive sectors on a CD-ROM. The composite data set is read into a RAM as a single data unit in a single data reading operation. The individual data of the composite data set are read from the RAM by specifying the respective data names.

19 Claims, 13 Drawing Sheets

US 6,508,712 B1

RECORDING MEDIUM HAVING SEQUENTIALLY ACCESSIBLE DATA RECORDING REGIONS, DATA ACCESS METHOD, GAME PROGRESS CONTROL METHOD, AND GAME MACHINE

BACKGROUND OF THE INVENTION

1. Field of the Invention

The present invention relates to a recording medium on which a computer-executable program is recorded, a data access method, a game progress control method, and a game machine all, of which are used for video games.

2. Description of Background Information

In recent game machines, large-capacity recording media such as the CD-ROM (compact disc-read only memory) are used to store data and a program that are necessary to execute a game. To use the program and data recorded on a CD-ROM, it is necessary to store them in a main memory. However, because of a limited capacity of the main memory, the program and data that are necessary to execute the game are read from the CD-ROM into the main memory every time information from them is needed.

Examples of data necessary to execute a game are model data of each object, texture data (image data), and effect sound data. When switching between scenes of a game (scene: a continuous unit part in the flow of a game), data that is necessary to execute the game in the new scene is read from the CD-ROM. In general, in a CD-ROM for a video game, various types of data are recorded in different recording regions, respectively.

Therefore, to read the various types of data from a CD-ROM, it is necessary to access a plurality of recording regions that are in segregates radial positions on the disc. To read such data, a data read head is moved radially in a seek operation. The seek operation takes time because the head is moved mechanically.

When a large amount of data is read from a CD-ROM at scene switching, there is a long data read time because several seek operations are needed. In other words, the scene switching time depends on the number of seek operations.

SUMMARY OF THE INVENTION

An object of the present invention is therefore to provide a computer-readable program recording medium, a data access method, a game progress control method, and a game machine that are suitable for shortening the data read time.

To attain the above object, the invention provides a computer-readable recording medium comprising a data recording area that is divided into a plurality of sequentially accessible unit data recording regions, wherein composite data that correlates a plurality of data that are used in the same scene of a video game and are connected to each other, data names of the respective data, and index information that is used to read out the plurality of data individually is recorded, as a single processing unit, in a plurality of unit data recording regions of the data recording area. More specifically, the index information includes information indicating the heads of the respective data.

In the recording medium according to the invention, a plurality of data are recorded in a plurality of consecutive recording regions. Therefore, the number of recording regions that are used in vain can be made smaller than in a case where data are recorded individually in different recording regions. Further, since the names of the respective data are recorded in composite data set together with the data. Therefore, the data can be read out individually after the composite data set has been stored.

The invention also provides a computer-readable recording medium on which a program for a video game that is run by a computer is recorded, the recording medium comprising a data recording area that is divided into a plurality of, sequentially accessible unit data recording regions each for recording of data having a prescribed length, wherein the program causes a computer to execute the steps of reading out, as a single processing unit, composite data that is recorded, as a single data, in a plurality of consecutive unit data recording regions on the recording medium and that correlates a plurality of data that are used in the same scene of the video game, data names of the respective data, and index information indicating heads of the respective data; storing the read-out composite data in a randomly accessible memory with each of the plurality of data as a processing unit by storing storage locations of the respective data based on the index information; and accessing one of the plurality of data stored in the memory that is necessary to advance the video game based on the data names in the stored composite data and a data name of the necessary data.

The invention also provides a computer-readable recording medium on which a program for a video game that is run by a computer is recorded, the program causing a computer to execute the steps of determining, in accordance with a manipulation input, a scene in which the video game is to advance in a virtual space; acquiring composite data to be used in the determined scene from a plurality of composite data, each of which includes a plurality of data that are used in the same scene of the video game and are given respective data names, and is recorded, as a single processing unit, in consecutive regions on the recording medium; and accessing individually the plurality of data included in the acquired composite data based on the data names, and advancing the determined scene by using the accessed data.

The invention provides a data access method comprising the steps of reading out, as a single processing unit, composite data that is recorded, as a single processing unit, in a plurality of consecutive unit data recording regions on a recording medium and that includes a plurality of data that are used in the same scene of a video game, data names of the respective data, and index information to be used to read out each of the plurality of data separately from the other data, the recording medium having a data recording area that is divided into a plurality of sequentially accessible unit data recording regions, each for recording of data having a prescribed length; storing the read-out composite data in a randomly accessible memory; and accessing one of the plurality of data stored in the memory that is necessary to advance the video game based on the data names and the index information in the stored composite data and a data name of the necessary data.

The invention provides an game progress control method for advancing a video game in a virtual space by using data recorded on a recording medium, comprising the steps of determining, in accordance with a manipulation input, a scene in which the video game is to advance in a virtual space; acquiring composite data to be used in the determined scene from a plurality of composite data each of which includes a plurality of data that are used in the same scene of the video game and are given respective data names, and is recorded, as a single processing unit, in consecutive regions on the recording medium; and accessing individually the plurality of data included in the acquired composite data based on the data names, and advancing the determined scene by using the accessed data.

Further, the invention provides a game machine comprising determining means for determining in accordance with a manipulation input, a scene in which a video game is to advance in a virtual space; acquiring means for acquiring composite data to be used in the determined scene from a plurality of composite data each of which includes a plurality of data that are used in the same scene of the video game and are given respective data names, and is recorded, as a single processing unit, in consecutive regions on the recording medium; and advancing means for accessing individually the plurality of data included in the acquired composite data based on the data names, and for advancing the determined scene by using the accessed data.

The present disclosure relates to subject matter contained in Japanese Patent Application No. HEI 11-327555, filed on Nov. 17, 1999, the disclosure of which is expressly incorporated herein by reference in its entirety.

DETAILED DESCRIPTION OF THE PREFERRED EMBODIMENTS

A recording medium, a data access method, a game progress control method, and a game machine according to an embodiment of the present invention will be hereinafter described in more detail with reference to the accompanying drawings.

Figure 1:
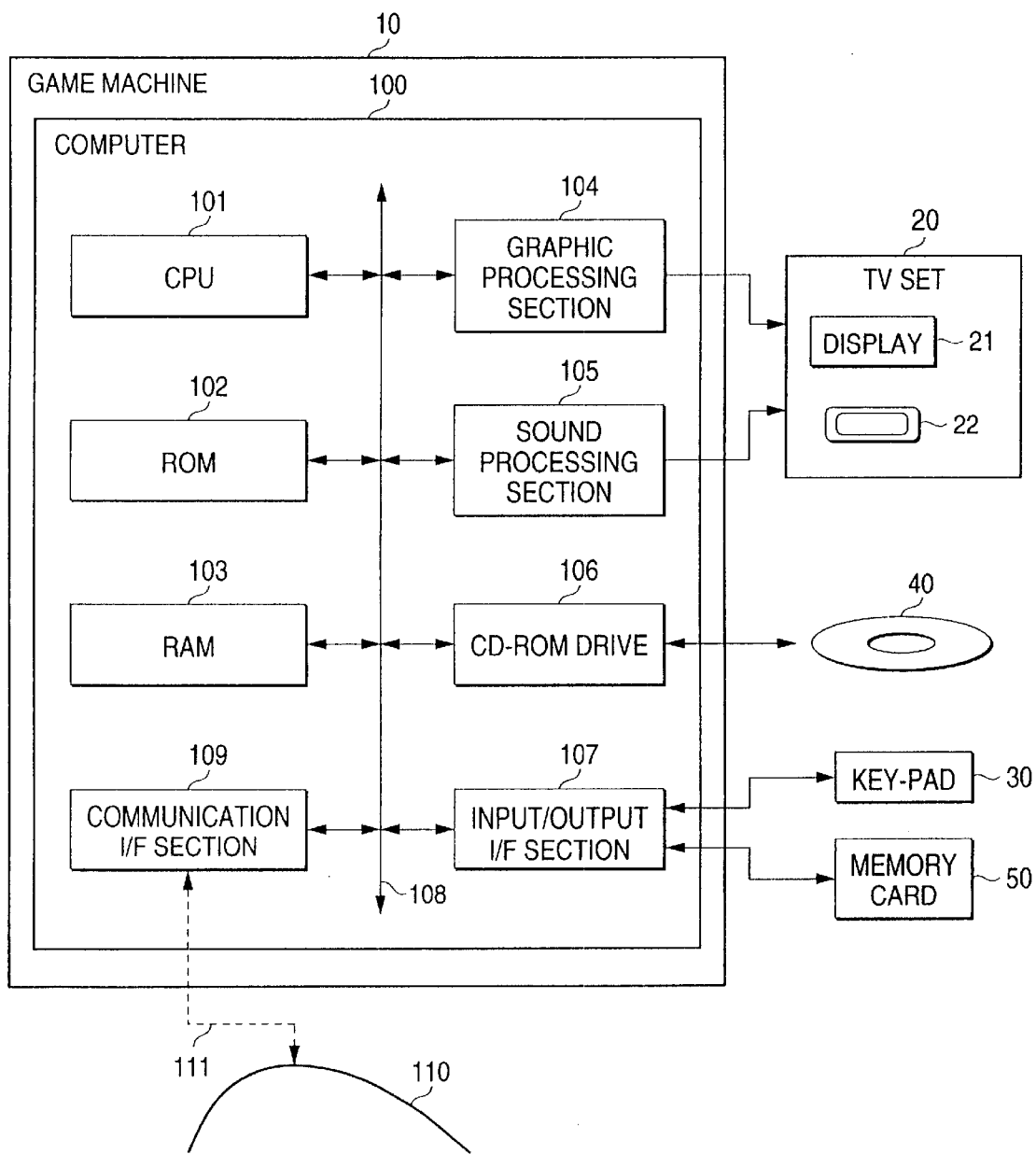
FIG. 1 is a schematic block diagram of a game system using a game machine according to the present invention that incorporates a computer.

As shown in FIG. 1, a game system 1 comprising a game machine 10 that can be detachably connected to, for example, a CD-ROM 40 on which a computer game program according to the invention is recorded, a television set 20, and a key-pad 30, which can be manipulated by a player.

The game machine 10 is a home game machine and includes a computer 100 contained in a single chassis.

The player opens a closable lid (not shown) by depressing an opening/closing button (not shown) on the game machine 10 and inserts the CD-ROM 40, for example. The game machine 10 initiates the computer game program recorded on the CD-ROM 40. The TV set 20 and the key-pad 30 are connected to the game machine 10 via cables.

The game machine 10 includes a card slot (not shown). A memory card 50, having an external auxiliary recording medium, can be inserted into the card slot. The player can store, on the memory card 50 arbitrary data that is necessary for restarting a game, such as data relating to a player character, an opponent character, and the state of the game program. By using the memory card 50, the player may later command restart of the game from a suspended position.

The television set 20 receives a video signal and an audio signal from the game machine 10. The television set 20 displays video corresponding to the received video signal on a screen 21, as well as outputs a sound corresponding to the received audio signal from a speaker 22.

The key-pad 30, which is generally called an interface, has a manipulation portion (not shown) on which a plurality of keys etc. to be manipulated by a player are provided. For example, four direction keys for moving a cursor being displayed on the screen 21 rightward, leftward, upward, and downward, a selection key, a start key, and first to fourth keys are provided. The invention is not limited to the game system shown in FIG. 1 nor game systems similar to it.

For example, the computer 100 is composed of a central processing unit (CPU) 101, a read-only memory (ROM) 102 for storing command sequences and data necessary for the CPU 101 to execute program instructions, a random access memory (RAM) 103 for temporarily storing a game program to be executed and data to be used by the game program and serving as a main memory, a graphic processing section 104, a sound processing section 105, a CD-ROM drive 106 to use with the CD-ROM 40, an input/output interface section 107, a communication interface section 109, and a bus 108 for connecting the above circuits.

The CPU 101 interprets and executes program instructions stored in the RAM 103 and controls the individual components of the computer 100 according to those instructions. Further, the CPU 101 responds to a manipulation command, which is input by a player through the key-pad 30 and sent via the input/output interface section 107, and controls the execution of the game program so that program portion corresponding to the manipulation command is executed. In implementing the program instructions, the CPU 101 executes the command sequences stored in the ROM 102 when necessary.

The graphic processing section 104 includes a video RAM (VRAM; not shown) and form frame buffers (not shown) in the video RAM. The graphic processing section 104 draws, for example, an image formed by polygons and representing an object on the frame buffers in accordance with a command that is supplied from the CPU 101. Further, the graphic processing section 104 generates a video signal corresponding to image information stored in the frame buffers and outputs the signal to a video circuit (not shown) in the television set 20.

The frame buffers paired. Images of a multiple objects in the same frame picture are stored in one of two pair of frame buffers. After completion of the generation of one frame picture, the next frame picture is stored in the other of the two frame buffers. In other words, a plurality of frame pictures are stored alternately in the pair of frame buffers.

Of the pair of frame buffers, one used to store a current frame picture and the frame picture that was stored last in the other frame buffer is read out from it. The frame buffer from which to read a frame picture is switched in synchronism with the vertical sync signal of the television set 20, and a new frame picture is generated in synchronism with the same signal. A frame picture display period (or a frame period) is equal to the period of the vertical sync signal.

The sound processing section 105 generates an audio signal representing a sound, a song, a sound effect, or the like, based on sound data stored in the RAM 103. The audio signal is supplied to the speaker 22 via an audio circuit (not shown) in the television set 20.

The input/output interface section 107 is connected to the key-pad 30 and the memory card 50, which is inserted in the card slot (not shown). The interface section 107 controls the timing of data transfer between the key-pad 30 or the memory card 50 and the CPU 101 or other circuits of the computer. Obviously, the computer that constitutes the game machine according to the invention is not limited to the computer 100 shown in FIG. 1 nor similar computers.

The CD-ROM 40 is a recording medium on which a game program and data used by the game program are recorded. The CD-ROM drive 106 reads the game program and data, stores them in the RAM 103 to be executed by the CPU 101. The game program and data used in the game machine 10 can be provided by other means.

For example, the game program and data may be incorporated in a carrier wave and received transmitted as a signal for execution by the computer 100. As a further example, the game program may be downloaded from another apparatus (not shown) on a network 110 to the communication interface section 109 via a communication line 111 and used by the game machine 10.

Another method is possible in which the game program and data are stored in advance in a memory of another apparatus on the network 110 that is connected to the game machine 10 via the communication line 111. The game program and data may be sequentially stored in the RAM 103 via the communication line 111 and used when necessary. The game machine 10 may be configured so as to accommodate only such alternative mode, as well as the mode incorporating a CD-ROM.

In this embodiment, data is read from the CD-ROM 40 into the RAM 103 every time the scene to be displayed on the screen 21 is switched.

Figure 2:
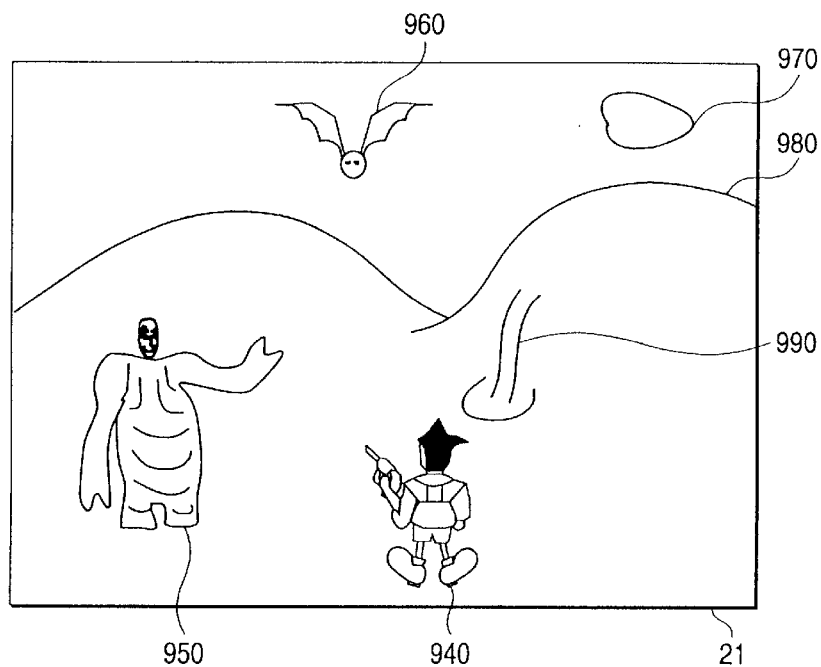
FIG. 2 schematically shows a picture that is included in one scene to be displayed in a video game.

FIG. 2 schematically shows an example game picture used in one scene. A picture consisting of a bird 960, a cloud 970, mountains 980, a waterfall 990, etc., are displayed on the screen 21. A player character 940 and an opponent character 950 to be involved in a fight are also displayed, superimposed on the above picture. A plurality of player characters or opponent characters may exist.

Display of this picture begins when the flow of a video game has changed and a new scene starts. This picture continues to be displayed during the progress of the game. To display this picture, data relating to the plurality of objects, the player character 940 and the opponent character 950 are read from the CD-ROM 40 (see FIG. 1) into the RAM 103.

If the player commands an attack with a weapon by manipulating the key-pad 30 (see FIG. 1) after display of the picture of FIG. 2, a scene for the attack is started. Before the start of the new scene, the necessary data are read from the CD-ROM 40.

Figure 3:
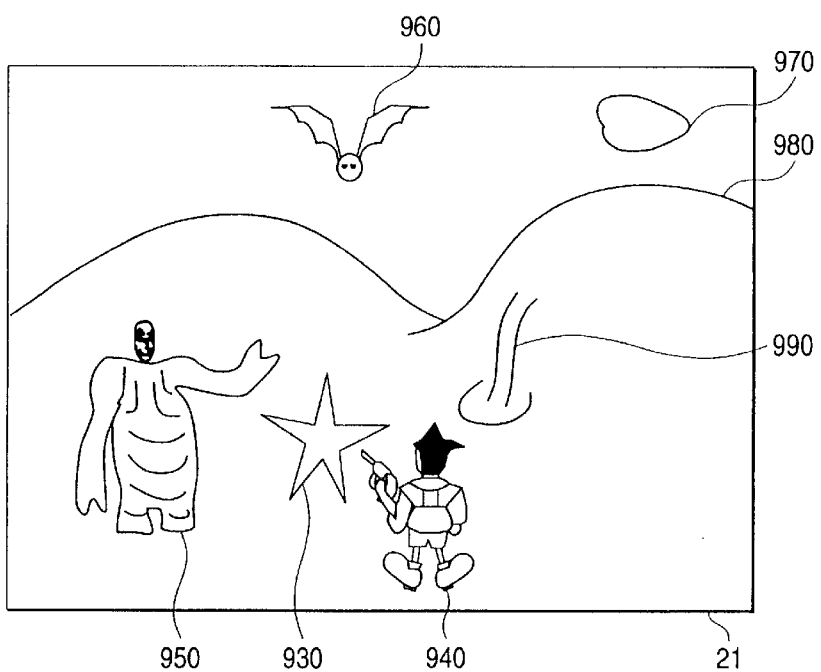
FIG. 3 schematically shows a picture that is included in another scene to be displayed in the video game.

For example, data relating to a spark object 930 shown in FIG. 3 are read out. The spark object 930 is displayed when, for example, the player character 940 shoots at the opponent character 950 with a gun in the scene. This spark object is an example of effect objects.

Figure 4:
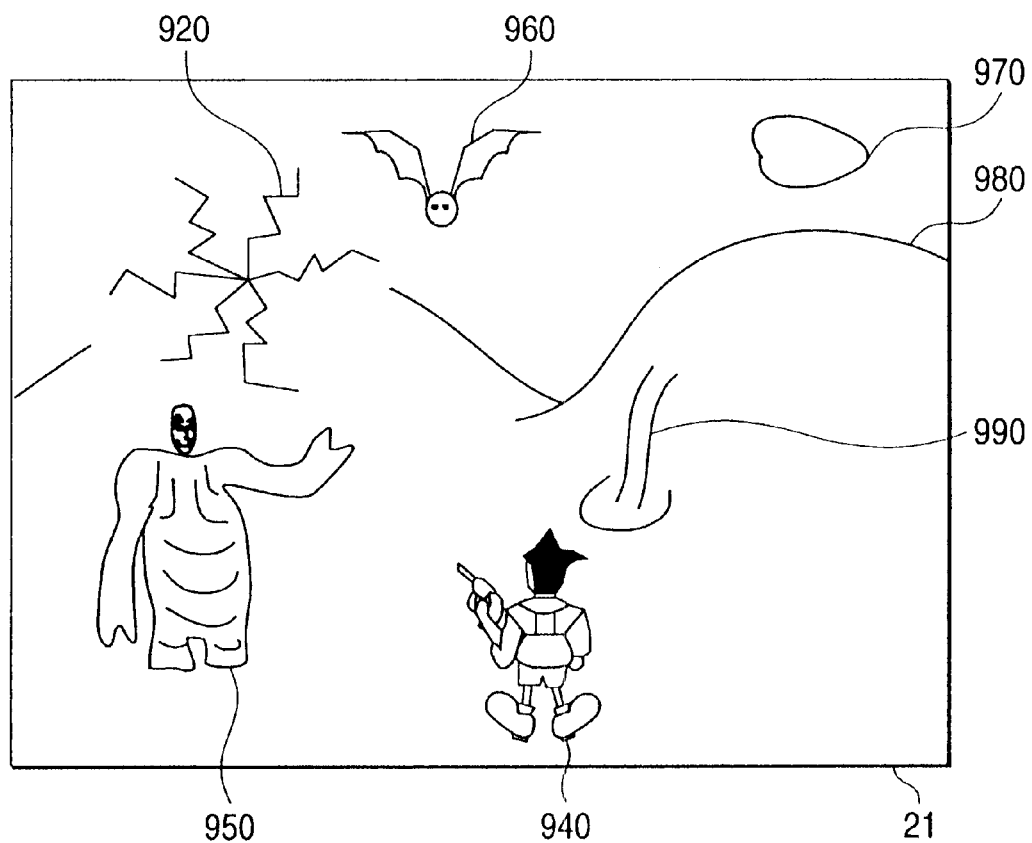
FIG. 4 schematically shows a picture that is included in still another scene to be displayed in the video game.

On the other hand, if the player commands an attack with magic in the scene of FIG. 2, a new scene for that attack is started. Before the start of the new scene, the necessary data are read from the CD-ROM 40. For example, data relating to a lightning object 920 shown in FIG. 4 are read.

The lightning object 920 is displayed when, for example, the player character 940 uses magic on the opponent character 950 in the scene. This object is also an example of effect objects.

In this manner, substantial data are read from the CD-ROM 40 at scene switching in a video game. This embodiment is intended to increase the speed of the reading operation from the CD-ROM 40 necessary at the time of scene switching.

Figure 5:
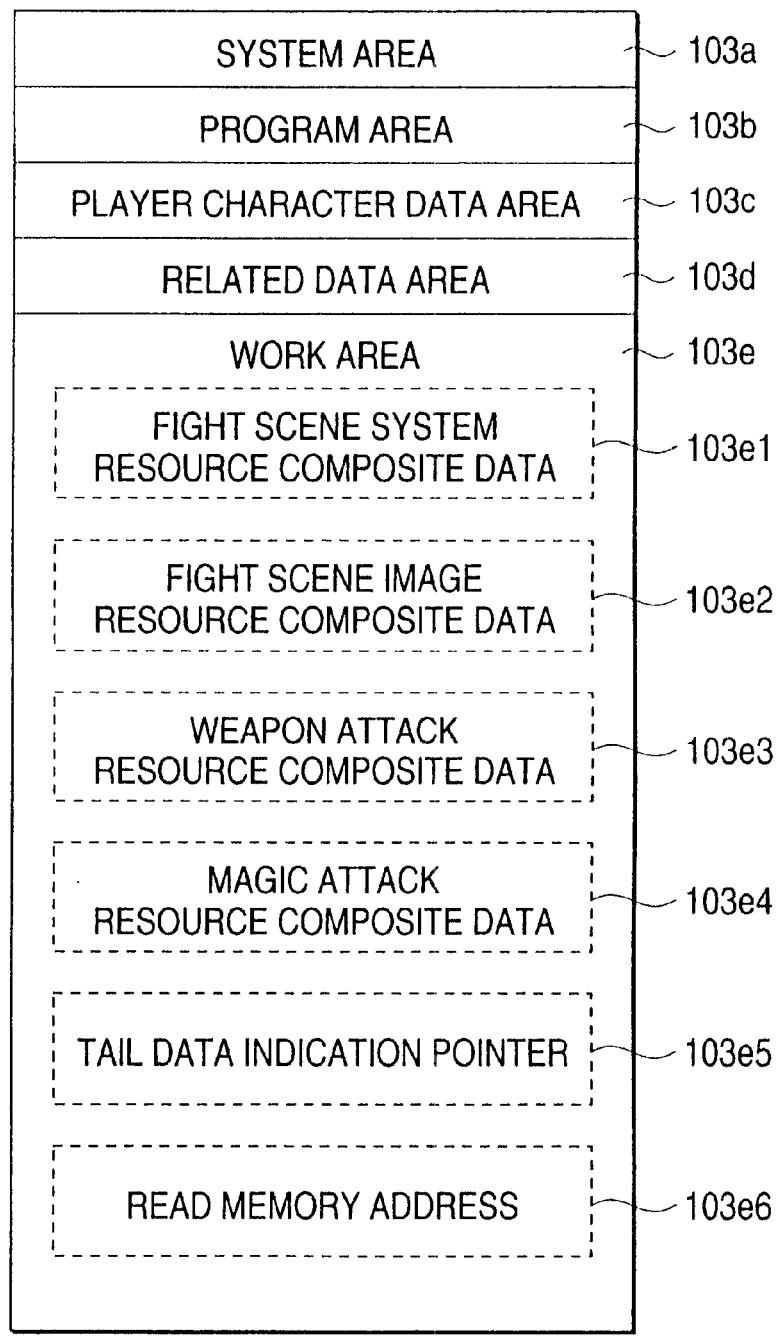
FIG. 5 shows an example memory map of a RAM in the computer that is included in the game machine.

During execution of a game program, the RAM 103 is used according to a memory map shown in FIG. 5, for example. System information necessary for a basic operation of the game, such as an interruption indicating a jump destination in an interruption processing routine, is stored in a system area 103*a*. The portion of the game program being executed is stored in a program area 103*b*.

A program portion for execution of a main process (described later) is also stored in the RAM 103. Data relating to the player character 940 and the opponent character 950, which will appear in the game, are stored in a player character data area 103*c*. Other related data that will be used during execution of the game program are stored in a related data area 103*d*. For simplicity, the other related data are not described here.

A work area 103*e* is used to temporarily hold other data during execution of the game program. Much of the data read from the CD-ROM 40 at scene switching are stored in the work area 103*e*. As described later, fight scene system resource composite data 103*e*1 and fight scene image resource composite data 103*e*2 are read into the RAM 103 at the start of a fight scene. Weapon attack resource composite data 103*e*3 are read at the start of a weapon attack scene. Magic attack resource composite data 103*e*4 are read at the start of a magic attack scene.

A tail data indication pointer 103*e*5 and a read memory address 103*e*6 are also stored in the work area 103*e*. A pointer indicating tail name-added data of the resource composite data last read into the RAM 103 are stored as the tail data indication pointer 103*e*5; that is, a memory address indicating the head of the tail name-added data is stored as a pointer. The value of the tail data indication pointer 103*e*5 is updated every time new resource composite data are read into the RAM 103.

The head address of name-added data related to resource composite data stored in the work area 103*e* are stored as the read memory address 103*e*6.

Figure 6:
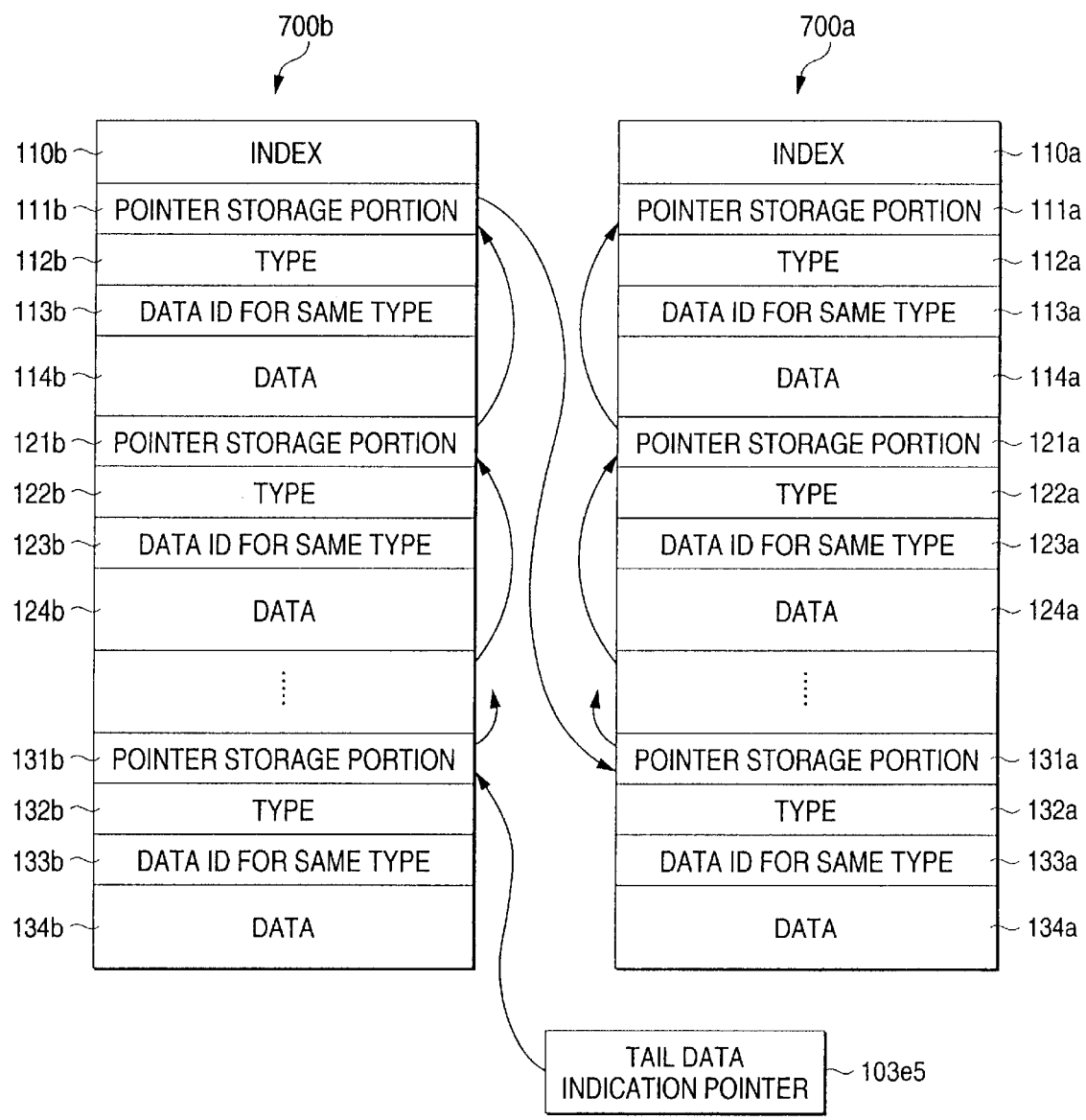
FIG. 6 shows an example structure of resource composite data in the RAM.

Next, a description will be made of the structure of resource composite data stored in the RAM 103. FIG. 6 shows an example structure of resource composite data stored in the RAM 103. Indices 110*a* and 110*b* are provided at the heads of resource composite data 700*a* and 700*b*, respectively, in the RAM 103.

Each of the indices 110*a* and 110*b* consists of a composite data name, a data total number, and a plurality of offsets. The composite data name is a name assigned for identification of the associated composite data. The data total number identifies the amount of data included in the associated composite data so as to be connected to each other. The offset indicates the difference between the head address of the composite data and the head address of the corresponding name-added data (a set comprising a pointer storage portion, TYPE, a data ID for the same type, and data) included in the composite data. Therefore, offset data exist in the number of name-added data included in the composite data.

A plurality of connected name-added data follow each of the indices 110a and 110b. In the following discussion, name-added data stored in an area relatively closer to indices 110a or 110b will be called "preceding data" or "preceding name-added data." Conversely, name-added data that is stored in an area relatively farther from indicies 110a or 110b will be called "following data" or "following name-added data." Name-added data stored in the area immediately after indices 110a or 110b will be called "next data."

Each set of name-added data consists of a pointer storage portion 111a, 121a, 131a, 111b, 121b, or 131b, TYPE 112a, 122a, 132a, 112b, 122b, or 132b, a data ID (identification) for the same type 113a, 123a, 133a, 113b, 123b, or 133b, and data 114a, 124a, 134a, 114b, 124b, or 134b.

The head memory address of the immediately preceding name-added data set is stored as the pointer storage portion 111a, 121a, 131a, 111b, 121b, or 131b. Information indicating a data type is stored as the TYPE 112a, 122a, 132a, 112b, 122b, or 132b. Examples of data type include graphic data, sound data, and camera data. The graphic data are used for picture display, including, for example, texture data. The sound data are used for reproduction of music or sound effects. The camera data define movement patterns or simulate a virtual camera in a scene.

An identifier for of each set of the same type data is stored as the data ID 113a, 123a, 133a, 113b, 123b, or 133b. The data of each type 114a, 124a, 134a, 114b, 124b, or 134b are to be actually used for picture display, game progress, or the like.

In the example of FIG. 6, the resource composite data 700a is read into the RAM 103 first and the resource composite data 700b is read into the RAM 103 next. Then, the head address of the tail name-added data of the resource composite data 700b is stored as the tail data indication pointer 103e5. The head address of the tail name-added data of the resource composite data 700a that was read into the RAM 103 earlier is stored as the pointer storage portion 111b of the head name-added data of the resource composite data 700b.

The head of each name-added data set is the pointer storage portion 111a, 121a, 131a, 111b, 121b, or 131b. Therefore, by tracing in order the addresses indicated by the printers in FIG. 6, starting from the tail data indication pointer 103e5, not only can all name-added data in the last-read resource composite data 700b be located but also the name-added data in the resource composite data 700a that was read into the RAM 103 earlier than the resource composite data 700b can be read out. That is, access can be performed with each name-added data set used as a processing unit.

The above game program is executed by the CPU 101 by using the other compounds of the computer 100 when necessary, whereby various functions intended by the game program are realized. As will be understood from the following description, the functions include a composite data reading function, composite data accessing function based on the respective data names, a game scene determining function, and a game advancing function.

Figure 7:
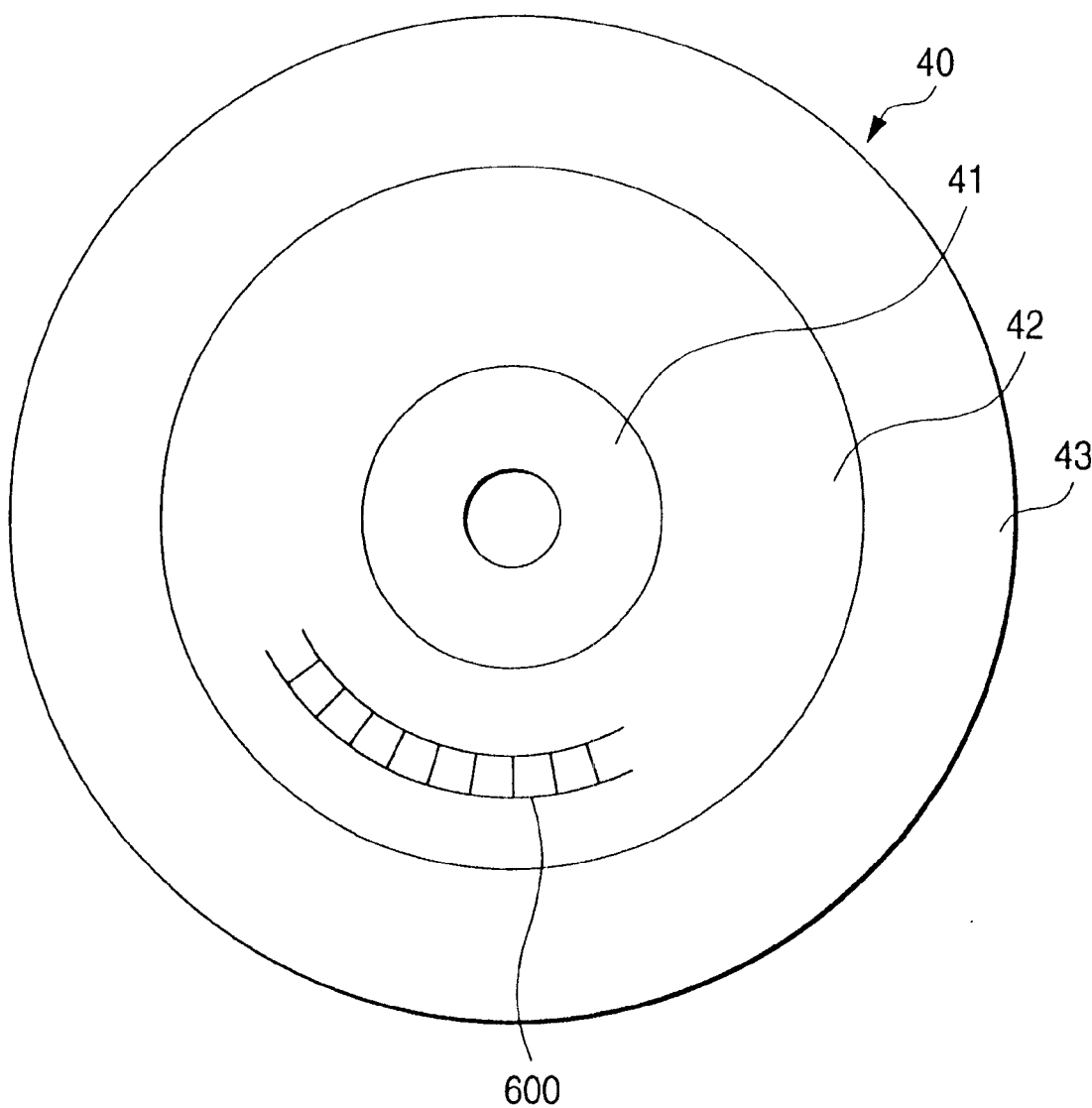
FIG. 7 shows different recording areas on a CD-ROM that is suitable for use in the game machine.

As shown in FIG. 7, a program recording area 41 is provided as a central portion of the CD-ROM 40. An area 43 containing video data to be used in the game is provided on a peripheral portion of the CD-ROM 40. A data recording area 42 containing data necessary to the progress of the game is provided between the areas 41 and 43. Thin-line tracks 600 for data recording are formed concentrically in each area of the CD-ROM 40. Various data are recorded on the tracks 600.

Data are recorded on the CD-ROM 40 according to an industry standard. For example, the CD-ROM 40 used in this embodiment complies with the ISO 9660 standard, according to which the tracks 600 are divided into a plurality of sectors 61, 62, 63, 64, 65, . . .

Figure 8:
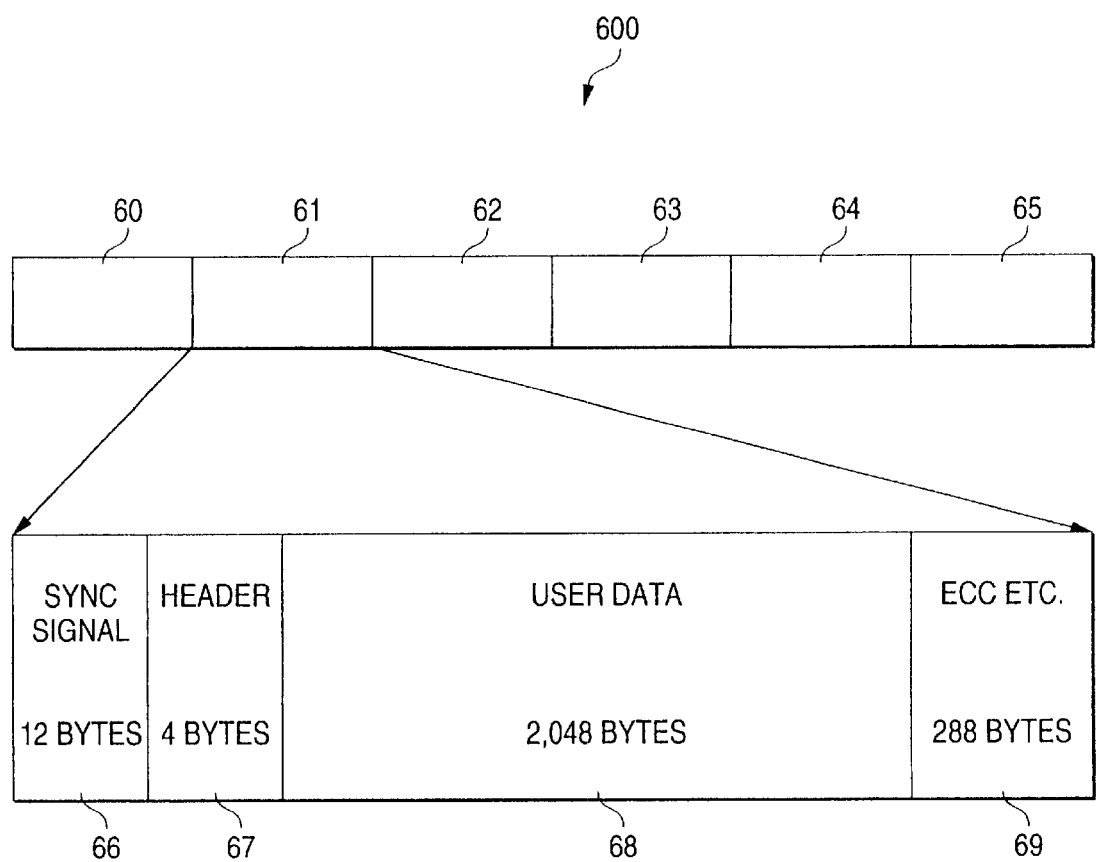
FIG. 8 shows a data format of each sector that is prescribed by a CD-ROM standard.

As shown in FIG. 8, each sector is subdivided into a sync signal region 66, a header region 67, a user data region 68, and an error correction data region 69, such as an ECC (error check code). The size of one sector is 2,352 bytes and the sizes of the respective regions 66–69 are 12, 4, 2,048, and 288 bytes, respectively.

The sector is the minimum unit for reading recorded data. A single sector is used to record data smaller than 2,048 bytes. Data larger than 2,048 bytes are recorded in a plurality of consecutive sectors. In particular, large data sets are divided into units of 2,048 bytes (the size of the user data region), each of which is recorded in the user data regions of consecutive sectors.

In the following description of data recording, for the sake of simplicity, the user data region will be regarded as an entire sector. Therefore, statements such as "data are recorded in a plurality of consecutive sectors" or "a plurality of partial data are recorded in a plurality of consecutive sectors" will be made.

As described above, it is necessary to read a large amount of data in quick succession from the CD-ROM 40 at scene switching. In this embodiment, to shorten the read time, a plurality of related data A, B, C, D, etc., are connected into one composite data set 700 and recorded in a plurality of consecutive sectors on the CD-ROM 40. The composite data set 700 contains data that will be used in the same period. The composite data set 700 is a processing unit in accessing the CD-ROM 40.

Figure 9:
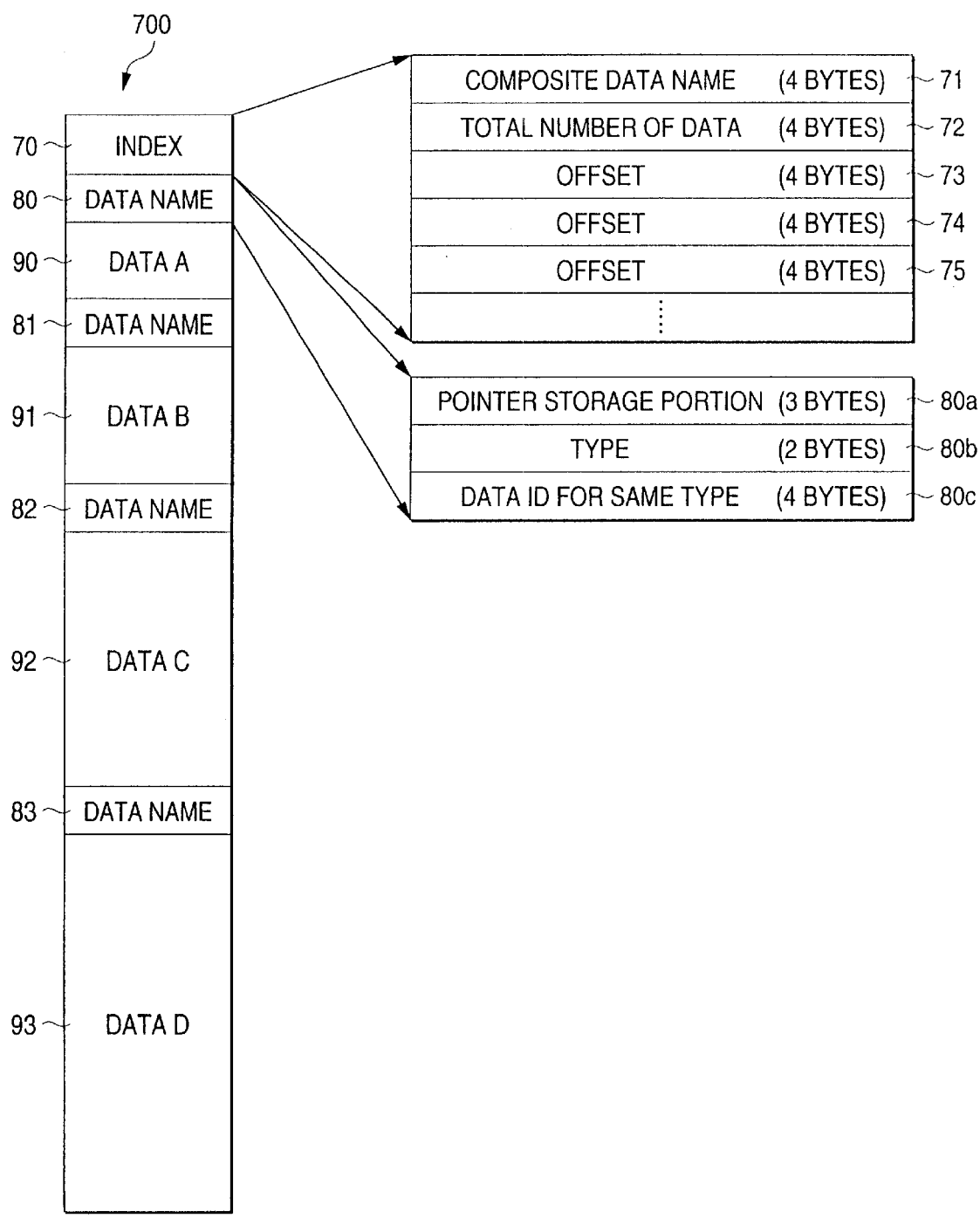
FIG. 9 shows the structure of composite data that is recorded on a CD-ROM that is suitable for use in the game machine.

The composite data set 700 includes an index 70 and a plurality of name-added data sets corresponding to different data. Each name-added data set has a data name at the head and a data main body following the data name. In FIG. 9, for example, a particular name-added data set has the data name 80 and data A 90. Similarly, a set having name 81 and data B 90, a set having name 82 and data C 92, and a set having name 83 and data D 93 are other examples of name-added data sets.

The index 70 includes information that enables the discrete use of individual sets within the composite data set 700 after it is read into the RAM 103. Specifically, the index 70 includes the name 71 of the composite data set 700, the total number 72 of data included in the composite data set 700, and a plurality of offsets 73, 74, 75, etc.

Each offset corresponds to one data set in the composite data set 700 and indicates, in bytes, a data length from the head position of the composite data set 700 to the data name located immediately before the corresponding data. In this example, the composite data name 71, the total number of data 72, and the offsets 73, 74, 75, etc., are each expressed by 4 bytes.

The data names 80, 82, 83, etc., are provided to enable access to each data set within the composite data set 700 by identifying the corresponding data name after the composite data set 700 is read into the RAM 103. In this example, each data name consists of a pointer storage portion 80a, a TYPE 80b indicating the type of the corresponding data, and a data ID 80c to be used for identification of data of the same type. The pointer storage portion 80a, the TYPE 80b, and the data ID 80c are expressed by 3 bytes, 2 bytes, and 4 bytes, respectively.

The composite data set 700 is recorded on the CD-ROM 40 as access unit larger than 2,048 bytes. That is, the composite data set 700 is subdivided into units of 2,048 bytes (size of the user data region) and sequentially stored in user data regions of circumferentially consecutive sectors of the CD-ROM 40. The subdivision is performed irrespective of the various sizes of different data sets included in the composite data set 700 and the boundaries between those data sets.

Usually, last portion of the composite data set 700 that is recorded is smaller than the user data region of the last consecutive sector. This results in an unused portion of the user data region. Dummy data (e.g., a sequence of zeros) is recorded in this unused portion. Therefore, the composite data set 700, plus the dummy data, set is recorded on the CD-ROM 40 in a space that is an integral multiple of the capacity of the user data region.

The composite data set 700 that has been recorded in this manner is handled as a single processing unit completely in the same manner as a single data unit that is recorded in a plurality of consecutive sectors, and is loaded from the CD-ROM 40 to the RAM 103 continuously by a single read operation. Specifically, when the name of the composite data set 700 is designated by a read request, the address of the head sector of the consecutive sectors where the composite data set 700 is stored and the number of sectors are found by using the TOC (table of contents) that is recorded in the innermost area of the CD-ROM 40. A seek operation is performed based on this address, and reading of the composite data set 700 is started when the read head has been moved to a position opposite to the head sector. The plurality of partial data sets of the composite data set 700 are sequentially read from the user data regions of the consecutive sectors equal to the specified number of sectors, starting from the head sector, and are stored in the RAM 103.

When the composite data set 700 has been read into the RAM 103, processing for making the individual data accessible is performed in the following manner. The offsets of the respective data set that are included in the index 70 of the composite data set 700 are referred to. The data length from the head of the composite data set 700 to the head of each data set is provided in the corresponding offset. By using the offsets thus referred to, the head address of the immediately preceding name-added data set is stored as the pointer storage portion of each name-added data set included in the composite data set 700.

Specifically, the head memory address of the area where the resource composite data set 700 has been stored is extracted and the offsets of the respective name-added data are added to the head memory address, whereby the head memory addresses of the respective name-added data are determined. The head memory addresses thus determined are stored as the pointer storage information of the next name-added data, respectively.

In general, where individual data are separately read from different regions on a CD-ROM, a seek operation and disc rotation delay occur for each data. In contrast, according to this embodiment, composite data sets can be read out by performing a seek operation and delay only once for each. Therefore, the read time of the composite data set 700 is much shorter than in a case where a plurality of data necessary for the same scene are recorded on a CD-ROM in a non-consecutive manner.

A method for using the above kind of composite data set during execution of a game program will be described below. A game program that is executed in this embodiment consists of an initialization process for setting initial data in the RAM 103 and a main process for generating and displaying a game picture.

Figure 10:
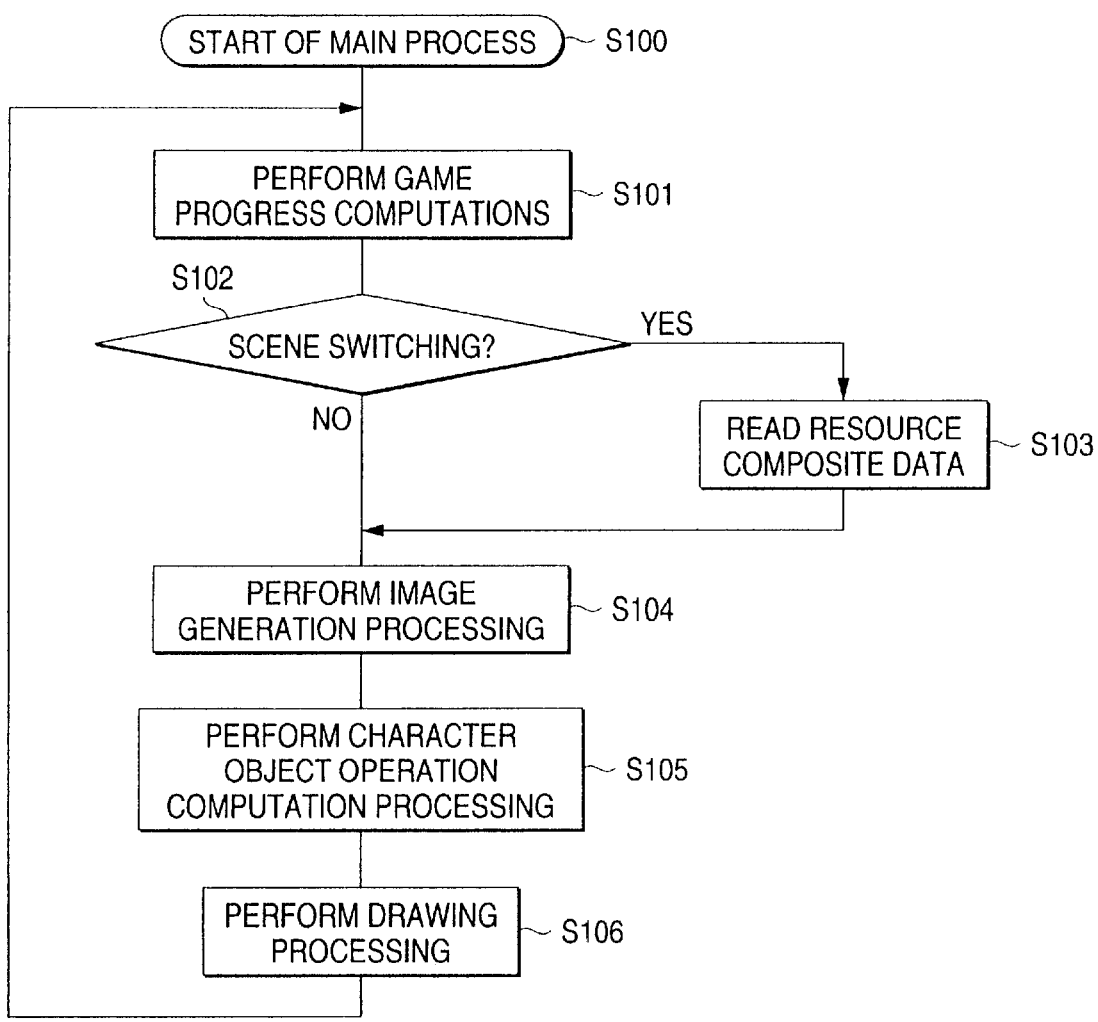
FIG. 10 is a general flowchart of a main process of a game program that is suitable for execution by the game machine.

As shown in FIG. 10, after the main process is started at step S100, computations relating to the progress of the game are performed a step S101 and the progress of the game is controlled. For example, whether to switch the scene or whether to start a fight is judged in accordance with a manipulation input command from the player.

At step S102, it is determined, based on a result of the computations at step S101 whether to switch the scene. If it is determined that the scene should be switched, at step S103 the resource composite data set, including many data to be used to advance the game in a new scene (such data may be hereinafter referred to as "resources" or "resource data"), is read from the CD-ROM 40 into the RAM 103.

When the resource composite data set has been read into the RAM 103, the above-described processing for making the individual data accessible is performed. Specifically, the offsets of the respective data in the index 70 are referred to and the head memory address of the immediately preceding name-added data is stored as the pointer storage portion of each name-added data. This makes it possible to access the name-added data individually.

When the last name-added data of the resource composite data set has been stored, the head memory address of the last name-added data is stored as the tail data indication pointer 103e5. The resource composite data set thus read includes various data to display many objects to constitute a picture and a player character and an opponent character that will appear in the new scene.

At step S104, image generation processing is performed by using the data thus read relating to the objects to constitute a picture. Specifically, whether to generate each of the plurality of objects to constitute a picture is determined. If it is determined that an object should be generated, the object's position in the three-dimensional virtual space is determined.

At step S105, character object operation computation processing is performed, that is, positions of the player character and the opponent character are calculated. If an instruction to move the player character has been commanded by a manipulation by the player, a new position of the player character after movement is calculated according to the instruction. A new position of the opponent character is determined in relation to the new position of the player character.

The images of the plurality of objects generated at step S104 are drawn in a frame buffer, and the images of the player character and the opponent character are drawn in the same frame buffer at the new positions after the movement that were calculated at step S105. A frame picture to be displayed next is generated in this manner. When a vertical sync signal occurs thereafter, the generated frame picture is displayed on the television set 20 and steps S101–S106 are repeated again.

At step S103, a plurality of resource data are read into the RAM 103 in the form of a composite data set as described above. A description will be made below of several resource composite data sets that are read into the RAM 103 when it is judged at step S101 (game progress computation) that a fight scene should be started.

Figure 11:
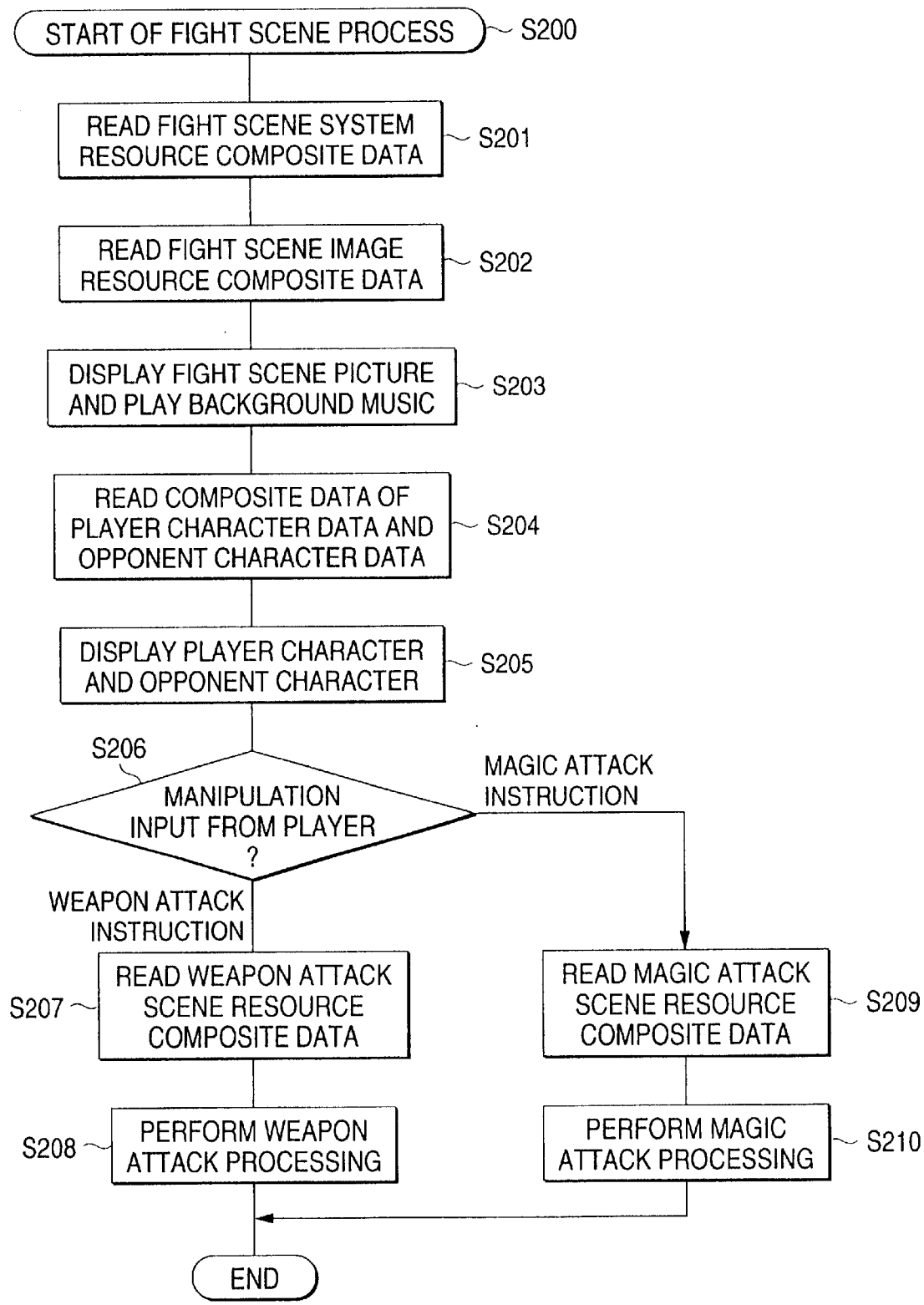
FIG. 11 is a general flowchart of a process that is part of the main process and is executed in a fight scene.

FIG. 11 shows a general flow of a process that is executed as part of the main process when a fight scene has been started, according to the invention. The process starts at step S200. A plurality of resource data are read into the RAM 103 in the form of a composite data set as described above at step S103 (see FIG. 10). That is, at step S201, a fight scene system resource composite data set is read into the RAM 103. This composite data set includes a plurality of resource data that will necessarily be used in the newly started fight scene.

For example, the composite data set includes sound data or waveform data representing a sound effect or the like, camera data indicating a viewing point for objects in the three-dimensional virtual space, a plurality of texture data (image data) to be used for texture mapping of, for example, objects of various gauges to be displayed on the screen 21 or effect objects to be used frequently in the scene, and model data representing models of these effect objects.

Figure 12:
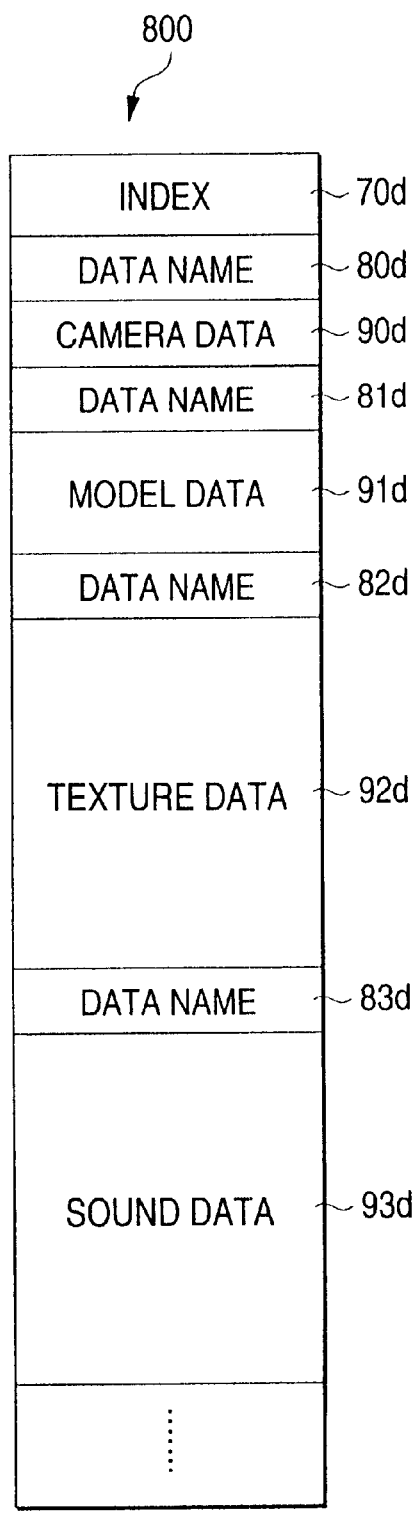
FIG. 12 shows example composite data to be read out from a CD-ROM.

The resource data are recorded in advance on the CD-ROM 103 as one composite data set 800 in a manner exemplified in FIG. 12, and read from the CD-ROM 40 into the RAM 103 as single data. An index 70 is stored as the head of the composite data set 800, and a data name 80d, a camera data 90d, a data name 81d, model data 91d, a data name 82d, texture data 92d, a data name 83d, and sound data 93d, etc., are stored following the index 70.

Then, at step S202, a fight scene image resource composite data set is read from the CD-ROM 40 into the RAM 103. This composite data set includes model data, texture data, etc., relating to a plurality of objects to constitute a picture.

At step S203, images of the objects to constitute a picture are displayed and a background sound is played by using the above two composite data sets. That is, at step S104 (image generation processing) in FIG. 10, computations for generating a plurality of objects to be displayed irrespective of manipulations by the player are performed by using the two composite data sets. At step S106 (drawing processing), images of the objects to be displayed are written to a frame buffer and the images that have been written to the frame buffer are displayed upon occurrence of a vertical sync signal. The sound data that was read into the RAM 103 is processed by the sound processing section 105 and a background sound is played.

Then, at step S204, the player character resource composite data set and the opponent character resource composite data set are read into the RAM 103. The player character resource composite data includes model data of a player character, motion data, a plurality of camera data indicating different viewing points for the player character, and model data of several weapons that can be used by the player character.

For example, the composite data set includes, as the camera data, camera data indicating a viewing point to be used in displaying the entire player character and camera data indicating a viewing point to be used in displaying a close-up image of the face of the player character. The same is true of the opponent character resource composite data.

At step S205, the player character and the opponent character are displayed by using the two composite data sets thus read. That is, step S105 (character object operation computation processing) in FIG. 10 is executed for those characters, whereby positions of those characters in the three-dimensional virtual space are determined. At step S106 (drawing processing), the images of the characters are recorded in a frame buffer. The images in the frame buffer are displayed upon occurrence of a new vertical sync signal. The picture of FIG. 2 is an example picture that is displayed at this stage. The fight scene is started in this manner.

When starting of an attack and the type of attack have been specified by manipulation command input by the player, it is determined at step S206 whether the type of attack is an attack using a weapon or an attack using magic, for example. Step S206 is actually executed as step S101 (game progress computation) in FIG. 10. At step S101, if the type of attack is an attack using a weapon, it is determined that switching should be made to a scene for execution of an attack using a weapon. Similarly, if the type of attack is an attack using magic, it is determined that switching should be made to a scene for execution of an attack using magic.

In the game according to this embodiment, a scene in which the player character attacks in accordance with a manipulation input from the player is a scene that has been determined arbitrarily by the player. In a scene that has been determined arbitrarily by the player, it is assumed that the player pays attention to a result of the progress of the game in the scene.

Therefore, it is possible to attract more interest of the player in the game by enhancing the effects in the scene. In view of this, in this embodiment, for a scene that has been determined mainly by the player, a display specialized for the scene is performed making scene switching.

If the manipulation input commands an attack using a weapon, at step S207 in FIG. 11, the weapon attack scene resource composite data set is read from the CD-ROM 40 into the RAM 103. If the manipulation input commands an attack using magic, at step S209, the magic attack scene resource composite data set is read from the CD-ROM 40 into the RAM 103.

For example, the weapon attack scene resource composite data set includes motion data suitable to express an operation of a weapon attack of the player character and model data of a special effect object to be displayed when the attack is made actually. The composite data set also includes similar motion data suitable to express a response of the opponent character when attacked. The same is true of the magic attack scene resource composite data set.

If the weapon attack scene resource data set has been read into the RAM 103, processing of the attack using a weapon is performed at step S208. If the magic attack scene resource composite data set has been read into the RAM 103, processing of the attack using magic is performed at step S210.

Specifically, referring to FIG. 10, before one of the two kinds of composite data sets is read into the RAM 103, a determination that scene switching should be made is performed at step S102 based on computations at step S101 (game progress computation). At step S103, one of the two kinds of composite data sets is read into the RAM 103. Then, upon occurrence of a vertical sync signal, the main process is performed again starting from step S101 (game progress computation).

If an actual attack is commanded by a manipulation input from the player at a certain time point, at step S105 (character object operation computation processing), a position of the player character is calculated in accordance with the manipulation input by the player. At step S106, (drawing processing), an image of an attack posture of the player character is generated based on newly read motion data of the player character and recorded in a frame buffer.

At step S104 (image generation processing), if the player character has actually shot the opponent character with the weapon or the player character has actually used magic on the opponent character, an effect object representing the shooting or magic is also generated. At step S106 (drawing processing), an image of the effect is generated based on newly read model data. The frame picture thus generated is displayed upon occurrence of a new vertical sync signal.

For example, if a weapon attack has been made, the picture of FIG. 3 including the spark object 930 as an effect object is displayed. On the other hand, if a magic attack has been made, the picture of FIG. 4 including the lightning object 920 as an effect object is displayed.

Each of the fight scene system resource composite data set, the fight scene image resource composite data set, the weapon attack scene resource composite data set, and the magic attack scene resource composite data set read from the CD-ROM 40 is stored in the work area 103e of the RAM 103 as a single data unit including consecutive data 103e1, 103e2, 103e3, and 103e4 (see FIG. 5).

Figure 13:
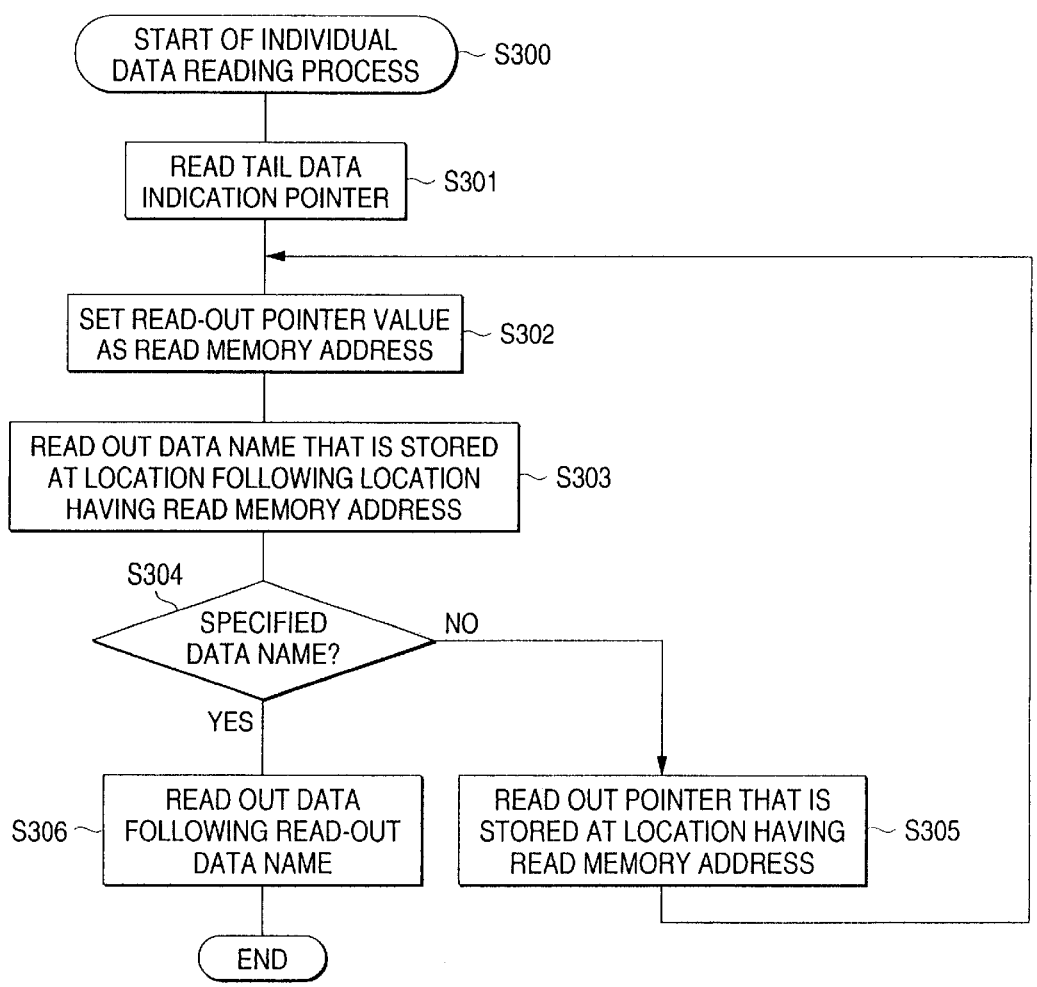
FIG. 13 is a general flowchart of a process for reading out individual data of composite data that was read into the RAM.

The individual data unit of the composite data that has been read into the RAM 103 are read out by using the respective data names in the composite data sets added to those data in a reading process shown in FIG. 13, which starts at step S300. For example, assume that the composite data set 700b shown in FIG. 6 is the fight scene system resource data 103e1. The name of data to be read in the composite data set 700b is specified by a read request for the data.

FIG. 13 is a flowchart of the individual data reading process. This process is executed upon issuance of a read request that specifies the name (i.e., a set of TYPE and a data ID for the same type) of individual data.

When a read request has been issued, at step S301 the memory address stored as the tail data indication pointer 103e5 is read out from the work area 103e (see FIG. 5). At step S302, the read-out memory address is set as the read memory address 103e6 (see FIG. 5).

When the read memory address 103e6 has been set, at step S303 access is made to a storage location having the set memory address and the name (i.e., a set of TYPE and a data ID for the same type) that is stored following a pointer that is stored at the accessed location is read out. It is judged at step S304 whether the read-out data name coincides with the data name specified by the read request.

If it is judged at step S304 that the data names do not coincide with each other, at step S305 the pointer that is stored at the storage location having the memory address that is set as the read memory address 103e6 is read out. This pointer indicates a data name that is stored immediately before the data that was the subject of the judgment.

Then, the process goes to step S302, where the read-out pointer is set as the read memory address 103e6. Then, steps S302–S305 are repeatedly executed for different name-added data in order of their arrangement until it is determined at step S304 that the data names coincide with each other.

If it is judged at step S304 that the data names coincide with each other, at step S306, data that are stored following the data name read at step S303 are read. The read-out data are returned as a response to the read request.

The TYPE portion that constitutes the name of the data included in the composite data set is so determined as to allow a program portion for processing the data to recognize that the data is model data, camera data, or sound data.

Therefore, when a program portion requests, by specifying its name, a resource management program to have certain data processed, the resource management program can easily recognize, based on the TYPE in the data name, a program portion that can process the data and can request the recognized program portion to process the specified data.

As is apparent from the above description, according to this embodiment, a plurality of data to be used in the same scene can be read from the CD-ROM 40 into the RAM 103 as a single data unit by a single read operation and hence can be read out in a shorter time than in a case where they are accessed separately. Further, the data in the composite data set can be used at an arbitrary time point by specifying its corresponding data name.

In the case of data that are used in the above video game, the total number of data included in one composite data set is about 100–200. Therefore, in the method of using composite data set according to this embodiment, the access time can be made much shorter than in the conventional technique in which those data are accessed individually. That is, where a composite data set of a plurality of data that are accessed consecutively, the total read time of the data shortens as the size of data in a composite data set increases.

Figure 14:
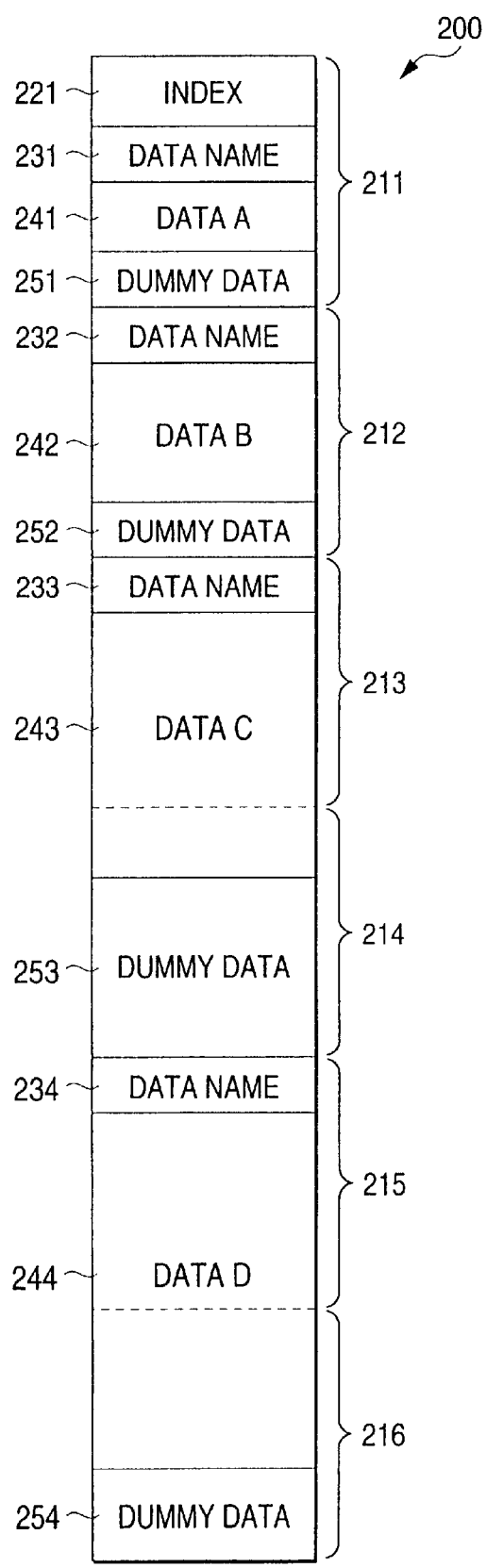
FIG. 14 shows another example of composite data for comparison with the composite data of FIG. 9.

FIG. 14 shows, for comparison, composite data set 200 have a different structure than the above-described composite data set. The composite data set 200 is sectioned into a plurality of partial data 211–216 each having a size that is equal to or an integral multiple of the size of the user data region of the sector. Each partial data does not include different name-added data. Each partial data is recorded in one or a plurality of sectors and different name-added data are not recorded in the same sector.

It is assumed that each of the name-added data A and B is smaller than 2,048 bytes and that each of the name-added data C and D is larger than 2,048 bytes and smaller than 4,096 bytes. Dummy data 251 is added to the name-added data A so that the total size of an index 221, the name 231 of data A (241), data A, and the dummy data 251 following data A amounts to 2,048 bytes. Partial data including data A (241) and having the same size as the user data region is generated in this manner. Similarly, second partial data including data B (252) is generated by adding dummy data 252 to the name-added data B so that the total size of the name 232 of data B (242), data B, and the dummy data 252 following data B amounts to 2,048 bytes.

On the other hand, third partial data including data C (243) is generated by adding dummy data 253 to the name-added data C so that the total size of the name 233 of data C (243), data C, and the dummy data 253 following data C amounts to two times the size (2,048 bytes) of the user data region. Similarly, fourth partial data including data D (244) is generated by adding dummy data 254 to the name-added data D so that the total size of the name 234 of data D (244), data D, and the dummy data 254 following data D amounts to two times the size (2,048 bytes) of the user data region.

Each of the above partial data has a size that is an integral multiple of the size of the user data region. In the composite data set 200 having the above structure, each partial data is recorded in one or a plurality of sectors and different data are not mixed in the same sector. The composite data set 700 shown in FIG. 9, which does not require the dummy data 251–254, has a smaller size than the composite data 200. Therefore, the read time of the composite data set 700 shown in FIG. 9 is shorter than that of the composite data set 200 shown in FIG. 14.

The average size of dummy data of one data is a half of the size of the user data region, that is, 1,024 bytes. In video games, the average size of one data included in a composite data set is 2–4 kilobytes (KB), that is, in a range from a value close to the sector size to a value approximately two times the sector size. Therefore, on average, dummy data accounts for about 25–50% of the data. In conclusion, the size of the composite data set 200 shown in FIG. 14 is larger than the composite data set 700 shown in FIG. 9 by about 25–50%.

Further, the total number of data is about 100–200 and the total size of the data amounts to about 0.4 megabyte (MB). Therefore, the total amount of dummy data included in the composite data set is relatively large and the read time of the composite data is increased accordingly. In contrast, the composite data set 700 shown in FIG. 9 is effective in consecutively reading, from the CD-ROM 40, many data having a size that is in a range from a value close to the sector size to a value several times the sector size as in the case of video games.

The invention is not limited to the above embodiment. It goes without saying that the embodiment can be modified or altered in various manners without departing from the spirit and scope of the invention.

For example, in the described embodiment, the name of each data set in composite data is located immediately before the data. It is possible to place data names at other positions. For example, data names may be located in the index before a group of offsets or after the index. As a further alternative, data names may be located in the index after the offsets of the data, respectively.

It is desirable that, as described in the embodiment, the index includes information relating to the amount of data existing from a prescribed position in the composite data to the heads of the respective data. The offsets used in the embodiment are an example of such information.

However, the offsets included in the index are used to make it possible to access the individual data in the composite data set. Therefore, offsets that are different from the offsets describe in the embodiment may be used as long as this purpose is attained. In the embodiment, the name of each data is located immediately before the data and the offset corresponding to the data indicates, in bytes, the length of the data existing from the head of the composite data set to the head of the data name that is added to the data in the composite data set.

Each offset is directly used to recognize the memory address of the corresponding data name. However, data is located immediately after its data name and therefore, in the embodiment, the corresponding offset is used to easily find the memory address of the head position of the data.

Further, each offset is used, together with the next offset, to recognize the length of the corresponding data. Therefore, satisfactory results should be obtained if basically each offset can be used to easily find the head position of the corresponding data and also to find the length of the corresponding data.

The head address and the length are used to access the corresponding data individually. Therefore, it is concluded that satisfactory results should be obtained if each offset can be used to distinguish the corresponding data in such a manner that it is separated from the other data.

For example, where the name of each data is separated from the data and located in the index, the index is required only to represent a data length from the head of the composite data set to each data. Alternatively, information directly indicating the data length of each data may be included in the index in addition to information indicating, as in the case of the embodiment, a length from the head of the composite data set to the name of the data.

In the embodiment, when certain data in a composite data set that has been read into the RAM is accessed by specifying its data name, a memory address of the data, having the data name, and the data length, may be stored as address information. When an access request that specifies the same data name occurs later, the access time can be shortened by using the memory address and the data length that are registered as the address information.

It is also possible to recognize in advance the memory addresses and the lengths of all data in composite data that has been read into the RAM and store, as address information, sets of a data name and the corresponding memory address and data length.

According to this method, even if an access request that specifies the name of any data in composite data occurs later, the corresponding memory address and data length can be used immediately, which shortens the data read time. It goes without saying that a data name in composite data may be used for reading the corresponding data by another method.

The computer of the game machine according to the embodiment may be provided with logic circuits for performing part of the functions of a game program used. Further, the game program may be altered so as to change the manner of performing its functions accordingly.

In the embodiment, the input device (key-pad) and the display device (television set) are provided separately from the game machine. However, one or both of the input device and the display device may be integrated with the game machine. The recording medium to be used by the game machine may be fixedly incorporated in the game machine instead of being provided detachably from the game machine.

The recording medium according to the invention and the recording medium used by the game machine according to the invention are not limited to the CD-ROM. They may be any computer-readable recording medium having a recording area that is divided into a plurality of unit recording regions that can be accessed sequentially, examples of which are the DVD, magnetic recording media, semiconductor memories, and other optical recording media.

Although in the described embodiment the home game machine is used as a platform, a game machine according to the invention may be realized by using, as a platform, a general-purpose computer such as a personal computer or an arcade game machine, or even a communication terminal such as a cellular telephone, a personal digital assistant, or a car navigation apparatus.

According to the invention, since composite data set that is formed by connecting a plurality of data for each scene is recorded in a medium as a single processing unit, at scene switching, composite data set can be read out from the medium in such a manner that data are kept connected to each other and hence the read time can be shortened.

I claim:

1. A computer-readable recording medium comprising:
a data recording area comprising a plurality of sequentially accessible unit data recording regions, wherein a composite data set is read as a single processing unit from the plurality of unit data recording regions in response to a single read operation, the composite data set comprising a plurality of data used in a scene of a video game and respective data names and index information, each of the plurality of data being selectable according to the corresponding data name.

2. The recording medium according to claim 1, wherein the index information comprises information indicating heads of the respective data.

3. The recording medium according to claim 1, wherein the single read operation occurs at a time of switching between scenes during the video game.

4. The recording medium according to claim 1, wherein the composite data is read from an external read-only memory.

5. A computer-readable recording medium on which a program for a video game run by a computer is recorded, the recording medium comprising:

a data recording area comprising a plurality of sequentially accessible unit data recording regions;

wherein the program causes the computer to:

read, in a single operation and as a single processing unit, a composite data set that is recorded as a single data unit in consecutive unit data recording regions of the plurality of sequentially accessible unit data recording regions, the composite data set comprising a plurality of data used in a scene of the video game, a plurality of data names corresponding to the plurality of data and index information indicating a plurality of heads corresponding to the plurality of data;

store the read composite data set in a randomly accessible memory with each of the plurality of data as a single processing unit based on the index information; and access one of the plurality of data stored in the randomly accessible memory to execute the video game based on the corresponding data name.

6. A computer-readable recording medium on which a program for a video game run by a computer is recorded, the program causing the computer to:

determine, in accordance with a manipulation command, a scene in which the video game is to advance in a virtual space;

read, in a single operation, a selected composite data set corresponding to the determined scene from a plurality of composite data sets, each of the plurality of composite data sets comprising a plurality of consecutively recorded data sets used in a same scene of the video game and respective data names;

record the selected composite data set as a single processing unit in consecutive regions on the recording medium;

individually access data from the plurality of data sets included in the selected composite data set based on the respective data names; and execute the determined scene using the accessed data.

7. The computer-readable recording medium according to claim 6, wherein the single read operation occurs at a time of switching between the determined scene and a previous scene of the video game.

8. The computer-readable recording medium according to claim 6, wherein the selected composite data is read from an external read-only memory.

9. The computer-readable recording medium according to claim 6, each of the composite data sets further comprising an index, including at least one offset indicating a location of each of the plurality of data sets in relation to a head position of the composite data set; and each of the plurality of data sets including a pointer storage portion that identifies an adjacent consecutively recorded data set of the plurality of data sets based on the offset;

the program further causing the computer to individually access the data from the plurality of data sets, in response to a requested data name, by sequentially reading the pointer storage portion corresponding to each data set, accessing the data in the adjacent consecutively recorded data set based on the read pointer storage portion and determining whether the accessed data corresponds to the requested data name.

10. The computer-readable recording medium according to claim 9, the program further causing the computer to:

store information in a tail data indication pointer portion that enables identification of a last data set of the plurality of data sets, wherein individually accessing the data from the plurality of data sets further comprises reading the tail data indication pointer portion and accessing the data of the last data set based on the tail data indication pointer portion;

store information in an initial pointer storage portion of the plurality of pointer storage portions that enables identification of a second last data set of a second plurality of data sets included in a previously recorded composite data set of the plurality of composite data sets, included in a previously recorded composite data set of the plurality of composite data sets, each of the second plurality of data sets comprising a second plurality of respective data names and a second plurality of pointer storage portions; and read the initial pointer storage portion, access at least the data of the second last data set based on the initial pointer storage portion and determine whether the accessed data corresponds to the requested data name.

11. A data access method comprising:

reading in a single operation, as a single processing unit, a composite data set that is recorded as a single processing unit in a plurality of consecutive unit data recording regions on a recording medium, the composite data set comprising a plurality of data sets and index information used to read the plurality of data sets, the plurality of data sets comprising a plurality of data used in a scene of a video game and a plurality of respective data names corresponding to the plurality of data;

storing the composite data set in a randomly accessible memory; and accessing a selected one of the plurality of data stored in the randomly accessibly memory to execute the video game, based on the corresponding one of the plurality of data names and the index information.

12. The data access method according to claim 11, the index information comprising at least one offset indicating a location of each of the plurality of data sets in relation to a head position of the composite data set; and each of the plurality of data sets further comprising a pointer storage portion that identifies an adjacent data set based on the at least one offset;

wherein accessing the selected one of the plurality of data comprises sequentially reading the pointer storage portions, accessing each of the plurality of data from the adjacent data set and determining whether the accessed data corresponds to the data name corresponding to the selected one of the plurality of data.

13. The data access method according to claim 12, further comprising:

storing information in a tail data indication pointer portion that enables identification of a last data set of the plurality of data sets, wherein accessing the select one of the plurality of data further comprises reading the tail data indication pointer portion and accessing the last data set based on the tail data indication pointer;

storing information in an initial pointer storage portion of the plurality of pointer storage portions that enables identification of a second last data set of a second plurality of data sets included in a second composite data set, the second plurality of data sets comprising a second plurality of data used in the video game scene and a second plurality of respective data names corresponding to the second plurality of data; and accessing at least the second last data set based on the information in the initial pointer storage portion and determining whether the accessed data set includes the data name corresponding to the selected one the plurality of data.

14. A game progress control method for executing a video game in a virtual space using data recorded on a recording medium, the control method comprising:

determining, in accordance with a manipulation command, a scene in which the video game is to advance in a virtual space;

acquiring, in a single operation, a composite data set to be used in the determined scene from a plurality of composite data sets, each of the composite data sets comprising a plurality of consecutively recorded data used in a same scene of the video game and respective data names, the acquired composite data set being recorded as a single processing unit in consecutive regions on the recording medium;

individually accessing at least one of the plurality of data included in the acquired composite data set based on the data name corresponding to the at least one plurality of data; and executing the determined scene based on the accessed data.

15. The game progress control method according to claim 14, wherein the acquiring occurs at a time of switching between the determined scene and another scene of the video game.

16. The game progress control method according to claim 14, wherein the acquired composite data set is acquired from an external read-only memory.

17. The game progress control method for executing a video game according to claim 14, the acquired composite data set further comprising:

an index, including a plurality of offsets corresponding to the plurality of consecutively recorded data, each offset indicating a location of the corresponding recorded data; and a plurality of pointer storage portions corresponding to the plurality of consecutively recorded data, each of the pointer storage portions identifying an adjacent one of the plurality of data based on the offset;

wherein individually accessing the at least one of the plurality of data comprises sequentially reading the plurality of pointer storage portions, accessing the adjacent data of the plurality of consecutively recorded data based on the read pointer storage portions, and determining whether the accessed data corresponds to the data name corresponding to the at least one plurality of data.

18. The game progress control method for executing a video game according to claim 17, further comprising:

storing in a tail data indication pointer portion information that enables identification of a last data of the plurality of data, wherein individually accessing the at least one of the plurality of data further comprises reading the tail data indication pointer portion and accessing the last data based on the tail data indication pointer portion;

storing in an initial pointer storage portion of the plurality of pointer storage portions information that enables identification of a second last data name, corresponding to a second last data of a second plurality of data included in a second composite data set from the plurality of composite data sets; and accessing at least the second last data based on the information in the initial pointer storage portion and determining whether the accessed data includes the data name corresponding to the at least one plurality of data.

19. A game machine comprising:

a determining system that determines in accordance with a manipulation command a scene in which a video game is to advance in a virtual space;

an acquiring system that acquires, in a single read operation, a composite data set to be used in the determined scene from a plurality of composite data sets, the composite data set comprising a plurality of data used in the determined scene of the video game and a corresponding plurality of data names, and recorded as a single processing unit in consecutive regions on the recording medium; and an advancing system that individually accesses the plurality of data included in the acquired composite data set, based on the plurality of data names, and executes the determined scene using the accessed plurality of data.

* * * * *